United States Patent Office 3,265,299
Patented August 9, 1966

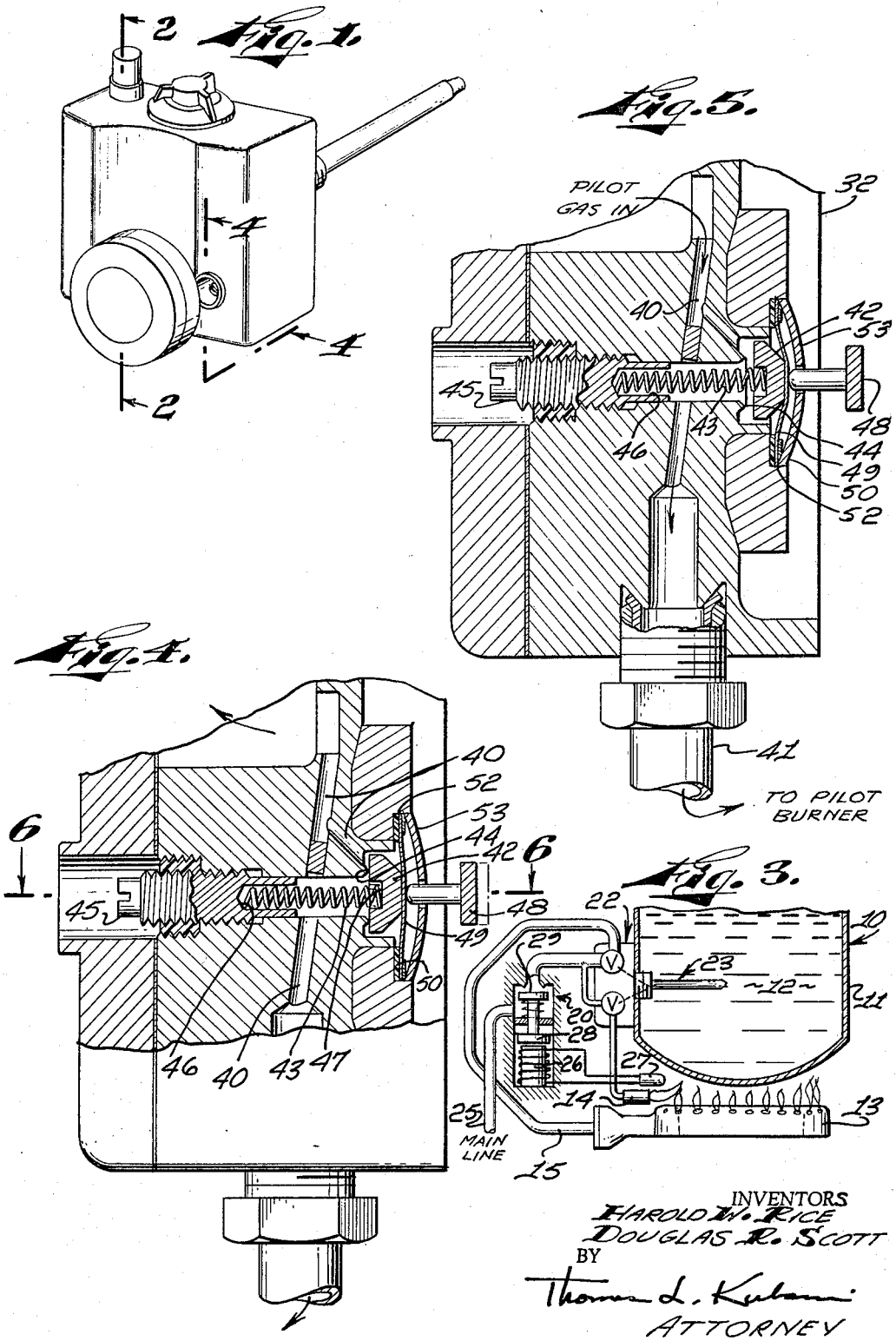

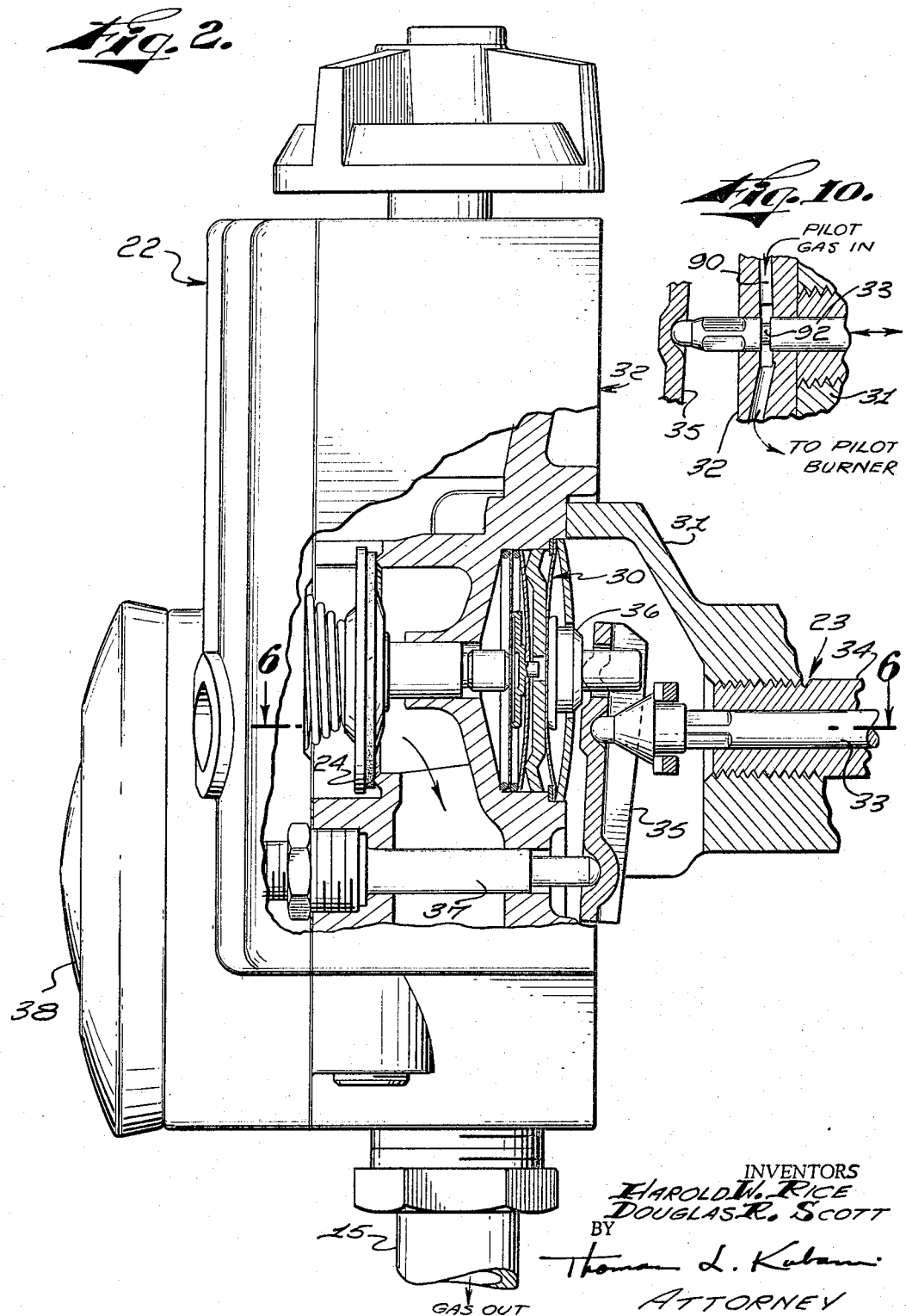

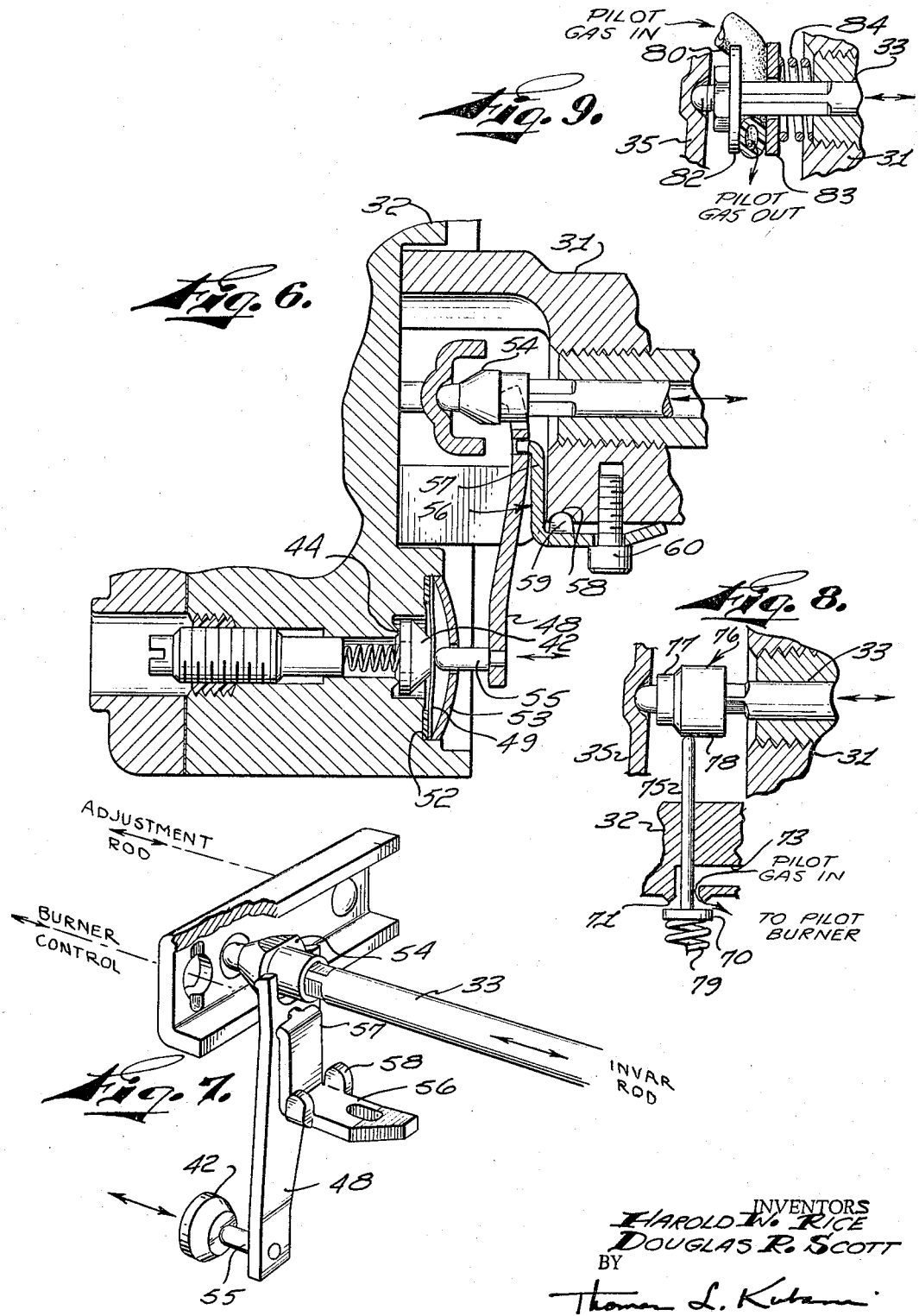

3,265,299
EXCESSIVE TEMPERATURE CUT-OFF CONTROL
Harold W. Rice, Fullerton, and Douglas R. Scott, Santa Ana, Calif., assignors to Robertshaw Controls Company, Richmond, Va., a corporation of Delaware
Filed July 24, 1963, Ser. No. 297,393
16 Claims. (Cl. 236—21)

This invention relates to a high temperature control and more particularly to a control for preventing over temperature conditions from developing in hot water heaters.

Currently, it is quite conventional to use a temperature control device in a hot water heater placed in the lower portion of a hot water tank to sense the temperature at the lower portion of the tank and intermittently add heat at the bottom of the tank. In order to prevent extreme temperatures from developing at the upper portion of the same hot water tank, it is quite normal and conventional to place a thermally responsive high limit switch separate and distinct from the control device at the lower portion of the tank. The high limit switch has bimetallic operating member which senses the temperature at the top of the tank and opens in the event an excessive temperature exists therein. Actuation of the switch would automatically shut off the entire control device and prevent further heat from being added to the tank.

It is quite conventional in hot water heater devices to use an automatic pilot shut-off valve which will operate in the event the pilot gas is extinguished, either accidentially or purposely, and will shut off all gas flow to the main hot water burner and pilot burner. The automatic shut-off includes a thermocouple placed in the flame of the pilot gas which will generate a current upon sustained heating of the couple. This current energizes an electromagnet which holds an armature and a valve in the open position during constant current generation at the thermocouple. The thermally responsive high limit switch is placed in series with the thermocouple circuit and has two electrical leads leading from the switch in series with the thermocouple leads and the electromagnet.

Normally the high limit switch is installed on the upper portion of the tank before the insulation and outer jacket shell are installed. Electrical leads are fished from the switch between the tank and the shell down to the control in the lower portion of the tank. The time and cost of the installation of this switch on the upper portion of the tank makes its cost to the manufacturer and homeowner an appreciable amount. Electrical leads are also attached to a junction box normally connected to the thermocouple assembly. This installation requires another step in the manufacturing process, all increasing the number of parts and costs of the total control package.

It is a great rarity for hot water heater controls used to regulate the amount of fuel directed to a burner to malfunction such that the control valve does not fully close, or the temperature sensor fails during the operation. At times dirt, foreign matter, metal shavings or the like may be found in the gas conduits leading to the control and may eventually be lodged upon the valve or valve seat which controls the amount of fuel passing through the control. Under this condition, a deleterious affect could occur, since the fuel could reach the burner regardless of the temperature sensor position. Without some type of high limit switch or over temperature control, the water within the tank would continue to raise in temperature until the tank burst due to the pressure generated within it or the water would back up throughout the household, or until a safety pressure valve could function to allow the steam which would be generated in the tank to escape.

In accordance with our present invention, our primary object provides a control which performs the function of a high limit switch and is incorporated within the control in the lower portion of the hot water tank.

Another object of the present invention is to provide an over temperature control which is integrally positioned with the main control unit in the lower portion of the hot water tank and operable by the same temperature sensor that operates the gas valve in the control.

Still another object of the present invention is to provide an over temperature control which operates directly upon the pilot gas passageway and functions in exactly the same manner as if the pilot gas was extinguished.

In accordance with our present invention, we have eliminated the undesired features of thermally responsive high limit switches mounted on the upper portion of a hot water heater tank. One feature of our present invention is to incorporate a high temperature limiting device which is operated directly by a thermostatic sensing element that can be integrally assembled and positioned in the lower portion of a hot water heater tank. This limiting device may be operable at a temperature setting which is different from that used for operating a thermostatic control and for convenience sake should be of a temperature setting above that of a normal thermostatic control.

In accordance with a feature of our invention, we use a movable valve to interrupt the flow of gas through the pilot gas passageway as the high temperature limiting device, and this valve is allowed to open by a motion transmitting means which is moved with selected movement of a temperature sensor mounted on the main control for a hot water heater tank.

According to another feature of the present invention, a flexible conduit may be used as part of the pilot gas passageway and this flexible conduit is compressed by selected movement of the temperature sensor under extreme temperature conditions.

According to another feature of the present invention, a groove formed in the temperature sensor operates as a valve which operates the pilot gas passage. Under selected movement of the temperature sensor, the groove will terminate pilot gas flow and cause the control to be shut down by an automatic gas shut off.

The present invention is not necessarily limited to any particular gas heated appliance, while it is primarily described in combination with hot water heater tank control. The present invention may be used on any gas heated appliance including heated vessels such as hot water heaters, room space heaters, forced air furnaces, and other heating appliances which use controls operated by thermally responsive actuating elements and use a pilot light which is normally burning. Furthermore, the invention is not necessarily limited to a control unit preventing excessive temperatures from developing in gas heated appliances but could, if desired, be used for control of temperatures developing of a very low nature or of any intermediate temperature, depending upon the adjustments which are set on the control.

Other features and advantages of this invention will become apparent from the following detailed description and the accompanying drawings of which:

FIGURE 1 is a prospective view of a gas control embodying our present invention;

FIGURE 2 is a partial vertical cross-sectional view taken at line 2—2 of FIGURE 1, showing in detail the operating mechanism for opening and closing the valve which controls the passage of gas to the main burner;

FIGURE 3 is a diagrammatic view of a gas control embodying the present invention in combination with a hot water heater;

FIGURE 4 is a partial cross-sectional view taken on line 4—4 of FIGURE 1 showing in detail, a valve interrupting the pilot gas passageway;

FIGURE 5 is similar to FIGURE 4 and illustrates the interrupter valve in an open position;

FIGURE 6 is a partial cross-sectional view taken along 6—6 of FIGURE 4 and illustrates the interrupter valve in a closed position and its operating lever which is in engagement with the temperature sensor;

FIGURE 7 is a partial prospective view of the operating lever which actuates the interrupter valve for the present invention in combination with a portion of the temperature sensor;

FIGURE 8 is another embodiment of the present invention shown as a partial vertical cross-section;

FIGURE 9 is a partial cross-sectional view of another embodiment of the present invention;

FIGURE 10 is a partial cross-sectional view of another embodiment of the present invention.

Referring now to FIGURES 1 and 3 of the drawings, the safety control system of the present invention is illustrated in conjunction with a hot water heater 10 including a storage tank 11 containing water 12 and being heated at its base by a main burner 13 adapted to be ignited by a pilot burner 14. A gas supply conduit 15 is connected to the burner 13 through an automatic pilot control indicated generally by the reference numeral 20, is formed integrally with the control and is connected to the main burner. A combined thermostat and automatic pilot control 22 may be of any suitable form and preferably is of the type shown and illustrated in detail on the U.S. patent to Jackson 2,658,515 and assigned to the same assignee as the present invention.

Referring now to FIGURES 1 and 2, the thermostat control 22 is responsive to the water temperature in the tank 11 and preferably of the type having a rod and tube temperature sensor element 23 extending into the tank 11 in thermal contact with the water 12 contained therein. The temperature sensor element 23 is operatively connected through appropriate means to a main valve 24 for controlling the supply of fuel to the main burner 13 and has direct connection to a source of fuel supply (not shown) by a pipe 25. In operation, the sensor element 23 responding to a minimum and maximum temperature of the water 12 being heated by the main burner 13 operates to open and close the main valve 24, thereby controlling the flame at the main burner 13 to maintain the temperature of the water 12 within close limits. A number of such thermostats are in common use today and well understood in the art, therefore further details and description are unnecessary.

An electromagnet 26 of a conventional variety is connected to a thermocouple 27 which is energized by the existence of a flame at the pilot burner 14. The arrangement being such that the electromagnet 26 is energized only while its condition is normal or safe as while a flame exists at the pilot burner 14. The electromagnet 26 cooperates with an armature 28 and is adapted to magnetically hold the safety valve 29 in its position as shown in FIGURE 3, when the armature 28 is mechanically brought into engagement with the electromagnet 26. In this position, the safety valve 29 is held in its open position allowing gas to flow from the source of gas to the control 22 and to the main and pilot burners 13, 14. In the event of release of the electromagnet 26, while the burner system is in operation, as due to the extinguishment of the pilot burner flame, a consequent release of the armature 28 effects seating of the safety valve 29 and thereby obstructs the flow of gas to the main and pilot burners 13, 14.

Referring to FIGURE 2, the thermally responsive means for operating the valve 24 which takes the form of the rod and tube sensor element 23, operates through the clicker disc mechanism 30 and is carried by a shank 31 which is secured to the exterior of the housing 32. The usual rod and tube sensor element 23 projects from the control 22 into the tank 11 of the water heater.

As is customary in such devices, the rod 33 has a relatively low coefficient of expansion while the tube 34 has a higher coefficient of expansion. The differential expansion between the rod 33 and tube 34, under the influence of increased temperature of the water in the tank, causes the rod 33 to move outwardly from the casing 32. Rod 33 engages a connecting lever 35 supported on the thrust button 36. The opposite end of the lever 35 is engaged by an adjusting screw 37 which extends through the casing 32. An adjusting knob 38 is mounted on the adjusting screw 37 exteriorly of the casing 32 for setting the temperature to be maintained within the tank 11.

Referring now to FIGURES 4 through 7, there is a passage 40 in casing 32 for the gas ducted to the pilot burner 14 which leads from the gas cock (not shown) in a conventional manner to the pilot gas conduit 41. A means for interrupting the flow of pilot gas may take the form of a valve 42 biased open by coil spring 43 which may operate from an alternately open or closed position in a manner depicted in FIGURES 4 and 5.

The interrupter valve 42 has a generally frusto-conical shape and is seated upon the valve seat 44 which intersects the pilot gas passageway 40. Flow adjusting screw 45 has a cylindrical cavity 46 therein which retains coil spring 43 during engagement therewith and the recess 47 within the valve 42. Thus, the valve 42 is normally in the open position unless external force is placed thereon by the lever 48 which is in engagement with valve 42 and the movable rod 33. A flexible metal diaphragm 49 resting upon a resilient gasket 50 is retained within the cavity 52 in casing 32 by a conventional welch plug 53. This arrangement prevents leakage of gas from the pilot passage 40 to the atmosphere.

A means for transmitting motion from the movable rod 33, may take the form of a lever 48 which is in engagement with the rod cap 54. The opposite end of the lever 48 has a leg 55 fixedly mounted thereon which projects through a hole in the welch plug 53 and is constantly in engagement with the metal diaphragm 49 on the top of the interrupting valve 42.

An L-shaped resilient bracket 56 has a leg 57 which engages the lever 48 to form a fulcrum and hold the lever 48 against the rod cap 54 and the valve 42. Bracket 56 has a pivot 58 formed thereon which mates with a cavity 59 in the shank 31 and allows the bracket 56 to rotate slightly as the adjusting srew 60 is rotated to change the position of the fulcrum of the lever 48. The rotation of the screw 60, in essence, changes the temperature at which the lever 48 will allow the valve 42 to open with reference to the temperature sensed by the rod and tube sensor element 23. Thus, it may be seen that moving the fulcrum on the bracket 57 to the right as viewed in FIGURE 6, requires that more movement of the rod 33 moving to the right is required before the lever 48 will rotate clockwise and close the interrupting valve 42.

In the operation of the present invention, the interrupting valve 42 is normally in an open position as illustrated in FIGURE 5, wherein the valve 42 allows gas to flow through the pilot passageway 40 to be emitted from and burned at the pilot burner 14, thereby heating the thermocouple 27. In the event some foreign material obstructs the closing of the main valve 24, see FIGURE 2, upon its seat, the valve under this condition would still allow gas to flow through the control 22 and to the main burner 13, thereby increasing the temperature of the water 12 within the tank 11. During this condition, the rod and tube sensor element 23 would sense this increase in temperature and the tube 34 would be extended to the right, carrying the rod 33 with it, see FIGURE 6, and in doing so, the lever 48 would pivot clockwise until the leg 55 forces the valve 42 against the seat 44. Any further movement of the rod to the right would cause an over travel which is absorbed in the L-shaped bracket 56 which would spring the remaining movement.

As the interrupter valve 42 closes off the flow of gas to the pilot burner 14, the pilot light would extinguish and the thermocouple 27 would gradually cool until it no longer generated current. The armature 28 in engagement with the magnet 26 would disengage causing the valve 29 to close, terminating all gas flow to the burners 13, 14. The control 22 would remain off until attention was given to the reason why the heater 10 was shutdown.

As the temperature within the tank 11 cools, the rod 33 would move to the left, see FIGURE 6, and in doing so, the lever 48 would rotate counterclockwise, allowing the spring biased valve 42 to open and allowing pilot gas to pass therethrough after the safety valve 29 in the automatic pilot control, see FIGURE 3, has been reset to the open position.

Another embodiment of the present invention is illustrated in FIGURE 8, wherein a control 22, (see FIGURE 2) is used in combination with an interrupter valve 70, spring biased closed against a valve seat 71; valve 70 intersects a pilot gas passageway 73 which leads from the gas source (not shown) to the pilot burner 14, FIGURE 3. A means for transmitting motion from the rod 33 includes a shaft 75 which is slidably supported by a portion of the casing 32 and abuts the valve 70 and the cam 76 which is fixedly mounted upon the rod 33. The cam 76 has two cylindrical surfaces 77, 78, thereon for the two positions of the valve 70, i.e., either being in the open or closed position with the operating position being illustrated in FIGURE 8.

In operation, as the temperature of the water 12 within the tank 11 approaches an extreme limit, the rod 33 would move to the right allowing the shaft 75 to move upwardly until it contacts the second cylindrical portion 77 of the cam 76 and thus allowing the interrupter valve 70 to close under the influence of the spring 79. This interruption of the gas flow through the pilot gas passageway would extinguish the flame at the pilot burner 14 and allow the electromagnet 26 to shut off all gas flow through the control and the remainder of the operation would be exactly the same as that discussed above.

Another embodiment of the present invention is illustrated in FIGURE 9 wherein control 22 of FIGURE 2 has the pilot gas passageway including a conduit 80 which is of a flexible nature and may be constructed from a soft silicone rubber material. The flexible conduit 80 may be attached to the pilot gas passageway within the interior of the casing 32 by any suitable means (not shown).

A means for transmitting the motion of the temperature sensor 23 may take the form of a flange 82 which is fixedly mounted on the extremity of the rod 33, and is in engagement with the flexible conduit 80. A ring 83 encircling the rod 33 and abutting the flexible conduit 80 is biased by the coil spring 84 in the position illustrated in FIGURE 9.

In operation, as the temperature within the tank 11 approaches an extreme limit, the rod 33 will continue to move to the right, and as it does, the flange 82 will compress the flexible conduit 80 against ring 83, until the passageway through the conduit 82 is completely closed, thus shutting off all pilot gas flow. This will extinguish the pilot burner 14 and the remainder of the operation is exactly the same as that described above. The over travel will be taken up by the spring 84 as the rod 33 continues to move to the right.

As the emperature within the tank 11 cools down, the rod 33 will move to the left thereby allowing the flexible conduit 80 to assume the position illustrated in FIGURE 9 and the control is ready for operation again.

Another embodiment of the present invention is illustrated in FIGURE 10, wherein the control 22 of FIGURE 2 has a pilot gas passageway 90 in the casing 32 passing adjacent to the movable rod 33. A groove 92 formed in the rod 33 is normally in the flow path of the pilot gas, as illustrated in FIGURE 10. During an over temperature condition, the rod 33 would move to the right and in doing so, the groove 92 would be displaced from passage 90, thereby interrupting the pilot gas. The electromagnet 26 would shut down in exactly the same manner discussed above. The rod would stay in the same position until the over temperature condition had been corrected, whereupon the groove 90 would assume the position as illustrated in FIGURE 10, under normal conditions.

It is to be understood that the present invention is not limited to use on controls that use electromagnetic pilot shut-off devices. Any automatic pilot shut-off device may be used which operates on the existence of a pilot flame. Other automatic shut-off devices such as mercury vapor devices, curie point materials, bimetal operators, all known in the art may be used equally as well as the device illustrated and described in this specification.

While a number of interrupting means for the pilot gas passageway and a number of means for transmitting the movement of the rod have been illustrated, there certainly are other mechanical equivalents of these elements which have not been illustrated and the present invention is only limited by the appended claims.

We claim:

1. Gas control apparatus including a housing having a main gas inlet and outlet with a main gas passage therebetween and with a valve interposed between the main gas inlet and outlet in said main gas passage, a temperature sensor mounted for operating said valve from an open to a closed position, a pilot gas passage through said housing, safety shut off means controlling both said main and pilot gas passages and being movable from open to shut-off positions whenever said pilot gas passage is closed, and an over temperature responsive control device for said pilot gas passage comprising:

a flexible conduit interposed as a portion of the said pilot gas passage, and a means for transmitting motion of said temperature sensor mounted on said housing adjacent to said flexible conduit, and a means for interrupting and deforming the flexible conduit to prevent gas passage therethrough, said motion transmitting means set to operate said interrupting means at a temperature above that set to operate the said valve by the temperature sensor.

2. Gas control apparatus as defined in claim 1 wherein the said flexible conduit is fabricated from a silicone rubber compound.

3. Gas control apparatus including a housing having a main gas inlet and outlet with a main gas passage therebetween and with valve means interposed between the main gas inlet and outlet in said main gas passage, a temperature sensor mounted for operating said valve means from an open to a closed position, a pilot gas passage through said housing, safety shut off means controlling both said main and pilot gas passages and being movable from open to shut-off positions whenever said pilot gas passage is closed, and an over temperature responsive control device for said pilot gas passage comprising:

a valve intersecting said pilot gas passageway, said temperature sensor including a tube mounted on said housing and a rod received within said tube and having an end extending within said housing, a cap positioned on said rod, an operating lever engaging said cap and said valve, and a pivot engaging said operating lever thereby allowing said lever to transmit motion from said rod to said valve, whereby the movement of the rod at selected temperature ranges will move the operating lever to actuate the said valve and interrupt the pilot gas passage.

4. Gas control apparatus including a housing having a main gas inlet and outlet with a main gas passage therebetween and with a valve interposed between the main gas inlet and outlet in said main gas passage, a temperature sensor mounted for operating said valve from an open to a closed position, a pilot gas passage through said housing, safety shut off means controlling both said main and pilot gas passages and being movable from open to shut-off positions whenever said pilot gas passage is closed, and an over temperature responsive control device for said pilot gas passage comprising:
- a means for interrupting said pilot gas passage,
- a lever abutting said interrupting means and temperature sensor,
- a means for pivoting said lever mounted on said housing and abutting said lever,
- whereby selected movement of said temperature sensor is transmitted to said interrupting means through the lever.

5. Gas control apparatus as defined in claim 4 in which said interrupting means is a biased valve.

6. Gas control apparatus including a housing having a main gas inlet and outlet with a main gas passage therebetween and with a valve interposed between the main gas inlet and outlet in said main gas passage, a temperature sensor having a rod and tube mounted for operating said valve from an open to a closed position, a pilot gas passage through said housing, safety shut off means controlling both said main and pilot gas passages and being movable from open to shut-off positions whenever said pilot gas passage is closed, and an over temperature responsive control device for said pilot gas passage comprising:
- a means for interrupting said pilot gas passage,
- a lever abutting said interrupting means and rod,
- a bracket mounted on said housing and having a first pivot point thereon,
- a second pivot point positioned on said bracket and abutting said lever,
- and a means for adjusting the position of said bracket pivot point,
- whereby the relative position of the second pivot point may be changed to actuate the interrupting means at different temperatures.

7. Gas control apparatus including a housing having a main gas inlet and outlet with a main gas passage therebetween and with a valve interposed between the main gas inlet and outlet in said main gas passage, a temperature sensor mounted for operating said valve from an open to a closed position, a pilot gas passage through said housing, safety shut off means controlling both said main and pilot gas passages and being movable from open to shut-off positions whenever said pilot gas passage is closed, and an over temperature responsive control device for said pilot gas passage comprising:
- a means for interrupting said pilot gas passage,
- a lever abutting said interrupting means and temperature sensor,
- a flexible bracket having a first pivot point thereon and said bracket being fixedly mounted on said housing,
- a second pivot point positioned on said bracket,
- and a means for flexing said bracket to change the relative position of said lever,
- whereby the lever may be adjusted to actuate the interrupting means at different temperatures.

8. Gas control apparatus including a housing having a main gas inlet and outlet with a main gas passage therebetween and with a valve interposed between the inlet and outlet, a temperature sensor mounted for operating said valve from an open to a closed position, a pilot gas passage through said housing, safety shut off means controlling both said main and pilot gas passages and being movable from open to shut-off positions whenever said pilot gas passage is closed, and an over temperature responsive control device for said pilot gas passage comprising:
- a means for interrupting said pilot gas passage,
- a cam device having two positions thereon mounted on said temperature sensor,
- and a movable link abutting said interrupting means and in engagement with said cam,
- whereby the relative position of said cam may be transmitted to said interrupting means upon changes of temperature sensed by said temperature sensor.

9. Gas control apparatus including a housing having a main gas inlet and outlet with a main gas passage therebetween and a valve interposed between the inlet and outlet in said main gas passage, a temperature sensor having a rod and tube mounted for operating said valve from an open to a closed position, a pilot gas passage through said housing, safety shut off means controlling both said main and pilot gas passages and being movable from open to shut-off positions whenever said pilot gas passage is closed, and an over temperature responsive control device for said pilot gas passage comprising:
- a biased valve interposed in said pilot gas passage for interrupting a flow of pilot gas therethrough,
- a two position cam device mounted on the extremity of said rod,
- a link abutting said cam device and in engagement with said biased valve,
- whereby said link may transmit the relative position of said cam to said biased valve thereby opening and closing the biased valve in accordance with changes from an over temperature condition sensed by the rod and tube temperature sensor.

10. In a safety control system for controlling gas flow, the combination comprising,
- a heating device having a main burner and a pilot burner,
- thermostatically operated valve means for regulating a gas flow to the main burner,
- pilot safety valve means movable between open and closed positions for shutting off gas flow to the main burner and the pilot burner,
- condition responsive means retaining said pilot safety valve means in the open position in response to operation of the pilot burner,
- interrupting valve means movable between open and closed positions for controlling the gas flow to the pilot burner,
- temperature sensor means having a normal operating range and an abnormal operating range,
- a first operative connection between said thermostatically operated valve means and said temperature sensor means whereby said thermostatically operated valve means is cycled thermostatically when said temperature sensor means is in its normal operating range, and
- a second operative connection between said interrupting valve means and said temperature sensor means whereby said interrupting valve means is moved to a closed position when said temperature sensor means is in its abnormal operating range.

11. The combination as recited in claim 10 wherein said temperature sensor means comprises a rod and tube thermostat assembly having a movable end portion for connection to said first and second operative connections.

12. The combination as recited in claim 11 wherein said second operative connection comprises lever means having one end for actuating said interrupting valve means and an opposite end for movement by said movable end portion, and adjusting means for maintaining said opposite end in operable engagement with said movable end portion.

13. The combination as recited in claim 11 wherein said second operative connection comprises shaft means having one end for actuating said interrupting valve means and an opposite end for movement by said movable end portion, and cam means on said movable end portion in operable engagement with said opposite end.

14. The combination as recited in claim 11 wherein said interrupting valve means comprises a flexible tube element and a rigid plate element bearing against said flexible tube element, and said second operative connection comprises flange means on said movable end portion to deform said flexible tube element against said rigid plate element.

15. The combination as recited in claim 11 wherein said interrupting valve means includes passage means for the gas flow to the pilot burner, and said second operative connection includes groove means on said movable end portion adapted for movement out of said passage means to close the same.

16. In gas control apparatus, the combination comprising
- a housing having a main gas inlet and outlet with a main gas passage therebetween and with a valve interposed therein,
- temperature sensor means having a rod and tube mounted for operating said valve between open and closed positions,
- a pilot gas passage through said housing,
- safety shut-off means controlling both said main and pilot gas passages and being movable from open to shut-off positios whenever said pilot gas passage is closed,
- said rod having a portion intersecting said passage, and
- a groove formed in said rod portion and permitting a pilot gas flow through said passage when said temperature sensor means responds to normal temperature conditions,
- said rod portion blocking the pilot gas flow through said passage by movement of said groove out of said passage when said temperature sensor means responds to an abnormal temperature condition.

References Cited by the Examiner

UNITED STATES PATENTS

| | | | |
|---|---|---|---|
| 2,576,675 | 11/1951 | Drow | 236—21 |
| 2,773,649 | 12/1956 | Hilgert | 236—21 |
| 2,774,539 | 12/1956 | Eskin | 236—21 |

FOREIGN PATENTS 513,550  11/1930  Germany.

EDWARD J. MICHAEL, *Primary Examiner.*